March 30, 1965 T. REUMERMAN ETAL 3,176,270

CODED CHARACTERS AND READING APPARATUS

Filed Oct. 19, 1960

3,176,270

CODED CHARACTERS AND READING APPARATUS

Theodorus Reumerman, 12 Zandvoortselaan, Zandvoort, Netherlands, and Willem Hendrik Theodorus Helmig, 9 Van Slingelandtlaan, Leiden, Netherlands
Filed Oct. 19, 1960, Ser. No. 63,632
Claims priority, application Great Britain, Oct. 20, 1959, 35,459/59
13 Claims. (Cl. 340—146.3)

Figure 1:
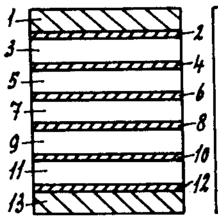

The invention relates to character recognition, and in particular to methods and means for translating characters appearing on a carrier, such as a sheet of paper, a card, a tape, the wheels of a counter, or the like, into electric signals adapted to control a machine in which the information represented by the characters is to be processed.

In our copending application No. 626,538, now abandoned, we have proposed a method of character recognition in which each character is provided with one or more gashes or interruptions in the form of parallel straight lines extending throughout the character. These interruptions appear in predetermined zones of the character, which will be called the interruption zones hereinafter, and may either be in the form of horizontal lines extending through the entire width of the character, or in the form of vertical lines extending through the entire height of the character. The pattern of the interruptions identifies the character according to a predetermined code, for instance a binary code. The characters are read by means of a rectilinear scanning element extending throughout the character in the direction of the said lines, and yielding an electric output current. The scanning is performed by a relative movement of the character carrier with respect to the scanning element in a direction perpendicular to the said lines, i.e. by a vertical movement in the case of horizontal interruptions, and by a horizontal movement in the case of vertical interruptions. The scanning element may be of any desired kind; use may be made, for instance, of an electromagnetic reading head of the kind used in magnetic memory devices, having a rectilinear air gap, of a rectilinear electric contact brush, or of an optical scanning element comprising a rectilinear light source and a photocell. Of course, there must exist a recognisable difference between the magnetic, electric, or optical properties, respectively, of the characters and their background (including the interruptions). The output current of the scanning element comprises certain components which correspond with the interruptions. With the aid of suitable amplitude filtering and/or integrating means, a set of impulses is derived from these components, which identifies the character according to the adopted code, and which may be used to control a machine, such as a computing or accounting machine, in which the information represented by the character is to be processed.

Although the above-described system is generally satisfactory, it has the limitation that the scanning speed, i.e. the speed of the relative movement of the character carrier with respect to the scanning element, must be kept constant with relatively narrow limits. This is due to the fact that the interruptions are successively detected by means of one and the same scanning element, so that the recognition of the character depends on a measurement of the time intervals between the detected interruptions, on the assumption that these time intervals are substantially proportional to the distances between the interruptions in the actual characters. This assumption is not always true; for instance, if the scanning is performed by moving the character carrier past a stationary scanning element, a slight hitch in the transport of the carrier may lead to a distortion of the output signal of the scanning element, whereby the identification of the character is disturbed.

It is an object of the invention to remove this disadvantage by providing a character recognition system making use of interruptions in the characters, as described hereinbefore, in which the recognition of the characters is independent of the scanning speed.

According to the invention, the scanning means comprise a plurality of scanning elements each associated with one of the interruption zones, and the scanning is performed by a relative movement of the character carrier with respect to the scanning means in the direction of the interruptions, in such manner that each scanning element detects whether or not an interruption appears in in the associated interruption zone.

In most character recognition systems, the alignment of the characters with respect to the scanning means involves considerable difficulties. The accepted procedure is to print the characters on a document at one or more predetermined standardised levels with respect to the lower edge of the document, and to place the document with its lower edge against a suitable guiding element during the scanning operation, in order to attain the required alignment. A first difficulty encountered in this procedure is that the usual printing equipment, such as a typewriter, or the printing mechanism of an adding, accounting or calculating machine, is not nearly accurate enough to keep the positions of the characters within the required narrow limits, so that a special, very accurate, but also very expensive printing mechanism has to be used. Secondly, if the documents consist of a relatively soft material, such as ordinary paper, they tend to crumple, either during the printing or scanning operation, or due to inconsiderate handling between these operations, so that the level of the characters with respect to the lower edge is not accurately defined. Thirdly, if the scanning is to be performed at a reasonable speed, it is found to be extremely difficult to keep the lower edge of the document right against the guiding member during the scanning operation. For all these reasons, alignment errors, whereby the position of the characters is neither too high or too low, or even askew with respect to the scanning means, are very liable to occur.

In the system according to our above-mentioned copending application, the recognition of the characters may be rendered, to some extent, independent of alignment errors by scanning a field which is somewhat larger than the character. For this purpose, the length of the scanning element and/or the sweep of the scanning movement must be larger than the corresponding dimensions of the characters. However, possibilities in this respect are restricted by the condition that the scanning field may never include parts of adjacent characters, and by the fact that the output signals of the scanning element becomes weaker as the area of the scanning field increases.

It is a further object of the invention to provide a character recognition system in which alignment errors are automatically corrected, and in which the position of the characters may be, within reasonable limits, askew with respect to the scanning means without affecting the recognition.

According to an additional feature of the present invention this object is realised by making use of a scanning head comprising a plurality of scanning elements, equally spaced in a direction perpendicular to the scanning movement, each associated with a register element, and alternately pertaining to at least two groups, in such manner that the distance between adjacent scanning elements of each group in said direction is equal to the distance between the centre lines of adjacent interruption zones in said direction, while the distance between the outermost scanning elements in said direction is larger than the dimension of the characters in said direction and the register elements associated with each group of scanning elements form a separate signal register.

Figure 2:
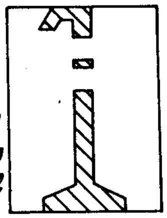
Figure 3:
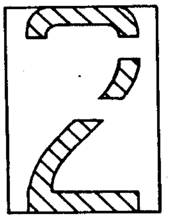
Figure 4:
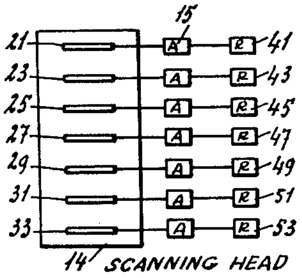
Figure 5:
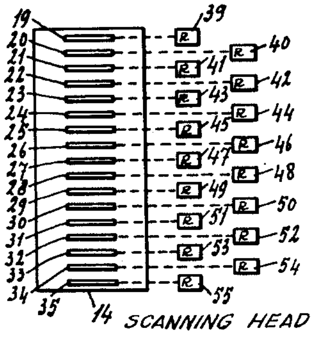
Figure 6:
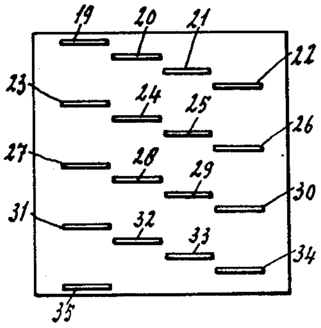

For a further explanation of the nature of our invention, reference is made to the accompanying drawings, in which:

FIG. 1 is a diagram showing the division of a character field in a plurality of horizonal zones;

FIGS. 2 and 3 show, by way of example, how the digits 1 and 2 might be represented in the character field of FIG. 1;

FIG. 4 schematically shows a scanning head and an associated signal register, embodying the general idea of the present invention;

FIG. 5 schematically shows a scanning head and two associated signal registers, embodying the above-mentioned alignment correction feature;

FIG. 6 shows a modification of the scanning head shown in FIG. 5.

The character field shown in FIG. 1 is divided in thirteen horizontal zones 1–13. Zones 3, 5, 7, 9 and 11 are the interruption zones; no interruptions occur in any other zones. For reasons to be explained hereinafter, the odd-numbered zones 1, 3, 5, 7, 9, 11 and 13 have a larger height than the even-numbered zones 2, 4, 6, 8, 10 and 12. Although horizontal zones have been shown for purposes of explanation, it will be understood that the invention is likewise applicable to a system making use of vertical interruption zones.

The characters to be recognised are assumed to be the digits from 1 to 0, of which the identity is indicated by interruptions according to a "two out of five" code. This code may, for instance, be as follows:

| Digits: | Interruptions in zones |
|---|---|
| 1 | **3** and **5** |
| 2 | **3** and **7** |
| 3 | **3** and **9** |
| 4 | **3** and **11** |
| 5 | **5** and **7** |
| 6 | **5** and **9** |
| 7 | **5** and **11** |
| 8 | **7** and **9** |
| 9 | **7** and **11** |
| 0 | **9** and **11** |

Where characters pertaining to a series of more than ten are to be recognised, a different code may be used. For instance, a "three out of seven" code enables the recognition of 35 different characters. It is to be understood, however, that the use of a code of the "*p* out of *n*" type, although it has certain advantages, is not essential for the invention; useful results may also be obtained with the aid of other codes, such as a binery code.

FIG. 2 shows a digit "1" in which horizontal interruptions are provided in zones 3 and 5, according to the above-specified code.

FIG. 3 shows a digit "2" with interruptions in zones 3 and 7. It will now be clear how the remaining digits from 3 to 0 are to be represented.

It is pointed out that the digits fit in the character field of FIG. 1, i.e., that the height of each digit is exactly equal to the height of the character field.

For the purpose of explanation, it is further assumed that the characters are printed on a document, by means of any suitable printing device, such as a typewriter, a stamp, or the printing mechanism of an adding, accounting or calculating machine, with the aid of a magnetisable ink, and that they are magnetised in known manner before the scanning operation.

The scanning head shown in FIG. 4 and generally indicated by the reference numeral 14, comprises seven scanning elements 21, 23, 25, 27, 29, 31 and 33, associated with zones 1, 3, 5, 7, 9 11 and 13 of the character field shown in FIG. 1 respectively. Each of these scanning elements is constituted by the air gap of an electromagnetic reading head of the kind used in magnetic memory devices; the coil wound on the magnetic core of each reading head is connected through a suitable amplifier 15 with a register element. Seven of these register elements are shown, indicated at 41, 43, 45, 47, 49, 51 and 53, and associated, respectively, with scanning elements 21, 23, 25, 27, 29, 31 and 33. Each of the register element has two stable positions, and may be brought from one of these positions into the other one by means of an electric impulse; for instance, the register elements may be formed as flip-flop circuits, or as ferrite rings. Together, they form a signal register, in which a signal indicating the identity of the character is registered.

The document bearing the characters is moved from left to right in a horizontal direction past the scanning head 14. As soon as a part of the character moves past one of the scanning elements, an impulse is generated, which is supplied through the associated amplifier to the associated register element, whereby the latter is brought from its first or neutral position into its second or operative position. The register element remains in the operative position until the scanning of the character has been completed, and is then returned to its neutral position in known manner.

It will be understood that, if the digit "1" shown in FIG. 2 is moved past the scanning head, register elements 41, 47, 49, 51 and 53 are brought into the operative position, while register elements 43 and 45, corresponding with the interruptions in the digit, remain in the neutral position. In the same manner, if the digits "2" shown in FIG. 3 is moved past the reading head, register elements 43 and 47, corresponding with the interruption in the digit, remain in the neutral position, while the remaining register elements are brought into the operative position. Thus, a signal indicating the identity of the digit may be taken from the signal register as soon as the scanning operation has been completed, and supplied to a machine in which the information represented by the digits on the document is to be processed.

Scanning elements 21 and 33, and the associated register elements 41 and 53, serve to check the alignment of the characters with respect to the scanning head. If the characters are accurately aligned with respect to the scanning head, the scanning elements 21 and 33 are both influenced by a part of the character, so that register elements 41 and 53 are both brought into the operative position. However, if the position of a character is too high, scanning element 33 is not influenced by the character any more, so that register element 53 remains in the neutral position. If the position of the character is too low, scanning element 21 is not influenced by the character, so that register element 41 remains in the neutral position.

Thus, it will be seen that the scanning of an accurately aligned digit will always result in a condition of the signal register in which register elements 41 and 53, and three of the remaining register elements are in the operative position. The signal registered in the signal register in this condition, will be called a "valid" signal hereinafter. If the signal register is not in the abovementioned condition, the signal registered will be called "invalid."

In cases where alignment errors are not very likely to occur, for instance if the documents are made of a rigid material, such as cardboard, and if a very accurate printing mechanism is used for printing the characters on the document, the scanning elements 21 and 33, and the associated register elements 41 and 53 may be omitted. It is then not necessary for the characters to fit exactly in the character field of FIG. 1, i.e. to have exactly the same height as the character field, but some of the characters may have a larger or smaller height, provided that the interruptions appear in the correct zones.

If alignment errors are to be expected, but do not occur very frequently, it may be sufficient to signalise the errors by means of the circuit of FIG. 4. A document leading to an invalid signal may then be rejected by the scanning apparatus, and treated in conventional manner.

If alignment errors occur more frequently, it is preferred to make use of the scanning head and associated registers shown in FIG. 5, by means of which alignment errors are automatically corrected. In describing the arrangement of FIG. 5, use will be made of the term "step," which denotes the distance between the centre of two adjacent interruption zones, such as 3 and 5 in FIG. 1. For the sake of simplicity, the amplifiers 15 have been omitted in FIG. 5, although amplifiers are used in the arrangement of FIG. 5 in the same manner as in the arrangement of FIG. 4.

The scanning head shown in FIG. 5 comprises two series of scanning elements. The first series consists of the scanning elements shown in FIG. 4, and two additional scanning elements, to wit a scanning element 19, cooperating with a register element 39 and located one step above the scanning element 21, and a scanning element 35, cooperating with a register element 55 and located one step below the scanning element 33. The (odd-numbered) register elements associated with the (odd-numbered) scanning elements of the first series constitute a first signal register.

The second series of scanning elements consists of the (even-numbered) scanning elements 20, 22, 24, 26, 28, 30, 32 and 34, cooperating with register elements 40, 42, 44, 46, 48, 50, 52 and 54, respectively. These last-mentioned (even-numbered) register elements constitute a second signal register. The scanning elements of the second series are located between the scanning elements of the first series, each at half a step from the adjacent scanning elements of the first series.

When an accurately aligned character is moved past the scanning head of FIG. 5, a valid signal occurs in register elements 41–53 of the first signal register, in the same manner as described hereinbefore with reference to FIG. 4, while register elements 39 and 55 remain in their neutral positions. Since the height of a scanning element is smaller than the height of an interruption zone, a valid signal continues to appear in the said register elements in the case of small alignment errors in either direction. In the specific embodiment described, the relative heights of the scanning elements and the interruption zones have been chosen in such manner that a valid signal continues to appear in register elements 41–53 for alignment errors up to a quarter of a step in either direction.

As soon as the alignment error increases beyond a quarter of a step in either direction, the second signal register takes over. For instance, if the character is half a step too high (again with a tolerance of a quarter of a step in either direction), a valid signal appears in register elements 40–52 of the second signal register. If the character is half a step too low (with the same tolerance), a valid signal appears in register elements 42–54 of the second signal register.

If the character is one step too high (again with a tolerance of a quarter of a step in either direction), no valid signal is obtained in either of groups 40–52 or 42–54 of the second signal register, but a valid signal now appears in the register elements 39–51 of the first signal register. In the same manner, a valid signal appears in register elements 43–55 of the first signal register if the character is one step too low (with the same tolerance).

Thus, it will be understood that a valid signal will always be obtained in either of the three groups of the first signal register, or in either of the two groups of the second signal register, for any alignment error up to one step in either direction. Where larger alignment errors are to be expected, the number of scanning elements may be further increased, so that a valid signal is still obtained in one of the two signal registers for the largest alignment error to be expected. Of course, such an increase of the number of scanning elements may involve the possibility that the scanning head engages two adjacent characters simultaneously. In the case of horizontal interruption zones, as shown in the drawings these adjacent characters would be placed one above the other. However, such a simultaneous engagement of two characters need not be deleterious to the recognition, provided that adjacent characters are spaced at a distance of at least three steps, so that parts of two characters cannot yield a valid signal between them. It is even feasible to make the scanning head deliberately so large that two or more adjacent characters are simultaneously engaged, in order to read these characters simultaneously. Thus, in the case of horizontal interruption zones, as shown in the drawings, it would be possible to read two or more lines of characters, placed on above the other, at the same time. Similarly, in the case of vertical interruption zones, two or more characters on the same line might be read simultaneously.

In all these cases, one or more test circuits (not shown) are provided to ascertain which groups of the first or second signal register contain valid signals, and to supply these valid signals to the processing machine. The two signal registers may overlap to some extent, i.e. there may be positions of the characters with respect to the scanning head in which valid signals appear both in the first and in the second signal register; this does not affect the recognition in any way.

In order that the second signal register may take over as soon as a valid signal ceases to appear in the first signal register, and vice versa, the height of the interruption zones must at least be equal to twice the height of a scanning element, plus the distance between two adjacent scanning elements. This is why the height of the interruption zones is larger than the height of the intermediate zones in FIG. 1. In general, the use of relatively high interruption zones is desirable, as it diminishes the chance that the interruptions become unrecognisable due to faulty printing. However, in cases where the above condition would lead to an excessive height of the interruption zones, a reduction of this vavlue may be obtained by using three series of interleaved scanning elements instead of two, cooperating with three signal registers. The term "height" applies, of course, to the dimension perpendicular to the scanning movement; in the case of vertical interruption zones it would designate the horizontal dimension of the scanning elements and the interruption zones.

As stated hereinbefore, each of the register elements is brought into its operative position as soon as a part of the character is moved past the associated scanning element, and it remains in the operative position until the scanning of the character has been completed; at that moment, all register elements are reset to their neutral positions. If the scanning speed is sufficiently constant, the resetting of the register elements may be controlled by a timing circuit, which is triggered at the moment at which the first register element is brought into the operative position, and resets the register elements after a suitable time lag. Where variations of the scanning speed are to be expected, it is preferred to make use of resetting registers in parallel to the signal registers. The register elements of these resetting registers would have the property of being brought into the operative position when a part of the character reaches the associated scanning element, in the same manner as the elements of the signal rgeisters, but they would have the additional property of being reset to the neutral position as soon as the said part of the character leaves the scanning element. Thus, all elements of the resetting registers would be in the neutral position when the scanning of the character has been completed, and this condition might be used to initiate the resetting.

In FIG. 5 the seventeen scanning elements are shown in a vertically aligned position, i.e. one above the other. Such a vertical alignment of the scanning elements is only possible if the elements can be made small enough. If this is not the case, the scanning elements may be arranged in staggered position, as shown in FIG. 6. Any staggered pattern of the scanning elements may be used, according to the dimensions of the elements. If the staggering leads to a width of the scanning head larger than the distance between the centre lines of adjacent characters, it will be necessary to duplicate the signal registers in order to accommodate the signal elements until each character has been completely scanned.

Although the invention has been described hereinbefore with reference to electromagnetic scanning, it will be understood that the principles of the invention may also be used in connection with other scanning methods. Thus, the scanning elements shown in the drawings may be replaced by electric scanning elements each consisting of two contact brushes at a short distance from each other, or by optical scanning elements, each consisting of a light source and a photocell. The properties of the characters must be varied accordingly, of course. For instance, in the case of electric scanning, the characters must be printed with a conductive ink.

We claim:

1. Apparatus for translating characters appearing on a carrier and each identified by the occurrence of a continuous linear interruption in at least one of a plurality of predetermined parallel interruption zones into electric signals, comprising a scanning head relatively displaceable with respect to said carrier in a direction substantially parallel to the direction of the said interruptions, and a plurality of scanning elements in said scanning head spaced with respect to each other in a direction perpendicular to the direction of said relative displacement at a distance equal to the distance between the centre lines of two adjacent interruption zones, and each yielding an electric output signal.

2. Apparatus as claimed in claim 1, further comprising a signal register, and a plurality of bistable elements in said register, each connected with one of the said scanning elements so as to change its condition upon occurrence of a part of a character in the associated interruption zone.

3. Apparatus as claimed in claim 1 for the translation of characters each identified by a constant number of interruptions according to a "$p$ out of $n$" code, $p$ being the said number of interruption zones, wherein the number of scanning elements in said scanning head is equal to $(n+2)$.

4. Apparatus for translating characters appearing on a carrier and each identified by the occurrence of a continuous linear interruption in at least one of plurality of predetermined parallel interruption zones into electric signals, comprising a scanning head relatively displaceable with respect to said carrier in a direction substantially parallel to the direction of said interruptions, a plurality of scanning elements in said scanning head, each yielding an electric output signal, equally spaced in a direction perpendicular to the direction of said relative displacement, and alternately pertaining to at least two groups in such manner that the distance between adjacent scanning elements of each group in a direction perpendicular to the direction of said relative displacement is equal to the distance between the centre lines of adjacent interruption zones in the same direction, at least two signal registers each associated with one of the said groups, and a plurality of bistable register elements in each of said signal registers, each connected with one of the scanning elements of the associated group so as to change its condition upon occurrence of a part of a character opposite to said scanning element, the distance between the outermost scanning elements in a direction perpendicular to the direction of said relative displacement being larger than the dimension of the characters in the same direction.

5. Apparatus as claimed in claim 4 for the translation of characters each identified by a constant number of interruptions according to a "$p$ out of $n$" code, $p$ being the said number of interruptions and $n$ the number of interruption zones, and comprising two groups of scanning elements, wherein one of the said groups contains $(n+4)$ and the other $(n+3)$ scanning elements.

6. Apparatus for translating characters appearing on a carrier and each identified by the occurrence of a continuous linear interruption in at least one of a plurality of predetermined parallel interruption zones into electric signals, comprising a scanning head relatively displaceable with respect to said carrier in a direction substantially parallel to the direction of the said interruption zones, and a plurality of scanning elements in said scanning head spaced with respect to each other in a direction perpendicular to the direction of said relative displacement at a distance equal to the distance between the center lines of two adjacent interruption zones, said scanning elements being arranged in staggered position and each yielding an electric output signal.

7. Apparatus as claimed in claim 6, further comprising a signal register, and plurality of bistable elements in said register, each connected with one of the said scanning elements so as to change its condition upon occurrence of a part of a character in the associated interruption zone.

8. Apparatus as claimed in claim 6 for the translation of characters each identified by a constant number of interruptions according to a "$p$ out of $n$" code, $p$ being the said number of interruption zones, wherein the number of scanning elements in said scanning head is equal to $(n+2)$.

9. Apparatus for translating characters appearing on a carrier and each identified by the occurrence of a continuous linear interruption in at least one of a plurality of predetermined parallel interruption zones into electric signals, comprising a scanning head relatively displaceable with respect to said carrier in a direction substantially parallel to the direction of said interruptions, a plurality of scanning elements in said scanning head, each yielding an electric output signal, equally spaced in a direction perpendicular to the direction of said relative displacement, and alternately pertaining to at least two groups in such manner that the distance between adjacent scanning elements of each group in a direction perpendicular to the direction of said relative displacement is equal to the distance between the center lines of adjacent interruption zones in the same direction, said scanning elements being arranged in staggered position, at least two signal registers each associated with one of the said groups, and a plurality of bistable register elements in each of said signal registers, each connected with one of the scanning elements of the associated group so as to change its condition upon occurrence of a part of a character opposite to said scanning element, the distance between the outermost scanning elements in a direction perpendicular to the direction of said relative displacement being larger than the dimension of the characters in the same direction.

10. Apparatus as claimed in claim 9 for the translation of characters each identified by a constant number of interruptions according to a "$p$ out of $n$" code, $p$ being the said number of interruptions and $n$ the number of interruption zones, and comprising two groups of scanning elements, wherein one of the said groups contains $(n+4)$ and the other $(n+3)$ scanning elements.

11. In combination with at least two signal registers, each of said signal registers including a plurality of bistable register elements each having an input means, apparatus for translating characters appearing on a carrier and each identified by the occurrence of a continuous linear interruption in at least one of a plurality of predetermined parallel interruption zones into electric signals, said apparatus comprising a scanning head relatively displaceable with respect to said carrier in a direction substantially parallel to the direction of said interruption, a plurality of scanning elments in said scanning head, each yielding an electric output signal, equally spaced in a direction perpendicular to the direction of said relative displacement, and alternately pertaining to at least two groups in such manner that the distance between adjacent scanning elements of each group in a direction perpendicular to the direction of said relative displacement is equal to the distance between the center lines of adjacent interruption zones in the same direction, means for connecting the scanning elements of one group to the input means respectively of the plurality of bistable register elements of one signal register, and means for connecting the scanning elements of the other group to the input means respectively of the plurality of bistable register elements of the other signal register.

12. The apparatus of claim 11 wherein the distance between the outermost scanning elements in a direction perpendicular to the direction of said relative displacement is larger than the dimension of the characters in the same direction.

13. Apparatus as claimed in claim 11 for the translation of characters each identified by a constant number of interruptions according to a "$p$ out of $n$" code, $p$ being the said number of interruptions and $n$ the number of interruption zones, and comprising two groups of scanning elements, wherein one of the said groups contains $(n+4)$ and the other $(n+3)$ scanning elements.

References Cited by the Examiner

UNITED STATES PATENTS

| | | | |
|---|---|---|---|
| 2,784,392 | 3/57 | Chaimowicz | 340—149 |
| 2,932,006 | 4/60 | Glauberman | 340—149 |
| 2,942,778 | 6/60 | Broido | 340—149 |

FOREIGN PATENTS

| | | |
|---|---|---|
| 820,283 | 9/59 | Great Britain. |

MALCOLM A. MORRISON, *Primary Examiner.*

IRVING L. SRAGOW, *Examiner.*